United States Patent
Costa

(10) Patent No.: US 6,206,544 B1
(45) Date of Patent: Mar. 27, 2001

(54) CATADIOPTRIC LENS SYSTEM FOR COLLECTING AND DIRECTING LIGHT FROM LARGE APERTURE LUMINESCENT LIGHT ILLUMINATING FIXTURES

(76) Inventor: Paul D. Costa, 1417 Bernel Ave., Burlingame, CA (US) 94010

( * ) Notice: Subject to any disclaimer, the term of this patent is extended or adjusted under 35 U.S.C. 154(b) by 0 days.

(21) Appl. No.: 09/131,073

(22) Filed: Aug. 7, 1998

Related U.S. Application Data

(60) Provisional application No. 60/055,882, filed on Aug. 15, 1997.

(51) Int. Cl.[7] .................................................. F21V 7/02
(52) U.S. Cl. ..................... 362/242; 362/84; 362/223; 362/222; 362/225; 362/217; 362/219; 362/221; 362/268; 362/331; 313/493; 313/487; 359/694; 359/704
(58) Field of Search .................... 362/84, 223, 222, 362/225, 217, 219, 221, 268, 331; 313/493, 487; 359/694, 704

(56) References Cited

U.S. PATENT DOCUMENTS

| | | | |
|---|---|---|---|
| 4,481,442 | * 11/1984 | Albrecht et al. | 313/493 |
| 4,695,763 | * 9/1987 | Ogasawara et al. | 313/487 |
| 5,128,848 | * 7/1992 | Enders et al. | 362/268 |
| 5,295,050 | * 3/1994 | Helstern et al. | 362/27 |
| 6,023,376 | * 2/2000 | Nomura et al. | 359/694 |

* cited by examiner

*Primary Examiner*—Sandra O'Shea
*Assistant Examiner*—Anabel M. Ton
(74) *Attorney, Agent, or Firm*—David E. Newhouse

(57) ABSTRACT

A projection illumination fixture includes luminescent light tubes lined with an emulsion coating of titanium dioxide and phosphors for producing an appropriate mixture of highly scattered red, blue and green wavelengths of sustained luminescent light emission, a reflector housing for reflecting scattered rays of emitted luminescent light toward an aperture, a catadioptric lens for collecting and redirecting luminescent light rays reaching the aperture into and through a light snoot or barrel and a large area projection (magnifying) Fresnel lens at the end of the light snoot or barrel for directing and spreading the emitted light to fill an illumination field with directional divergent light ideal for dimensionally 'painting' talent and objects positioned and moving within the illumination field.

19 Claims, 7 Drawing Sheets

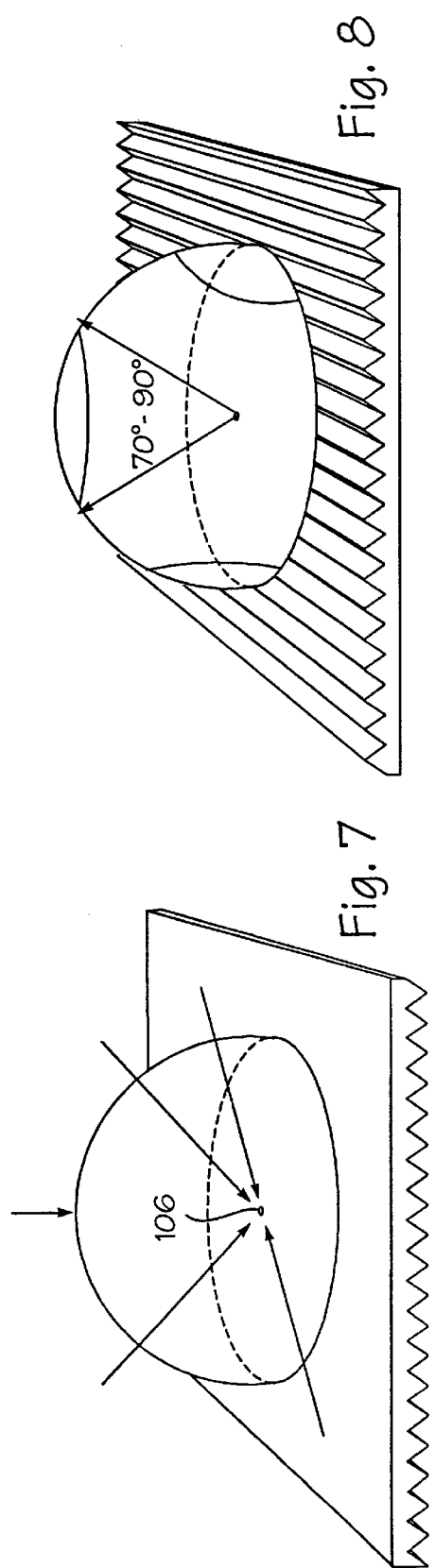
Fig. 8
Fig. 7
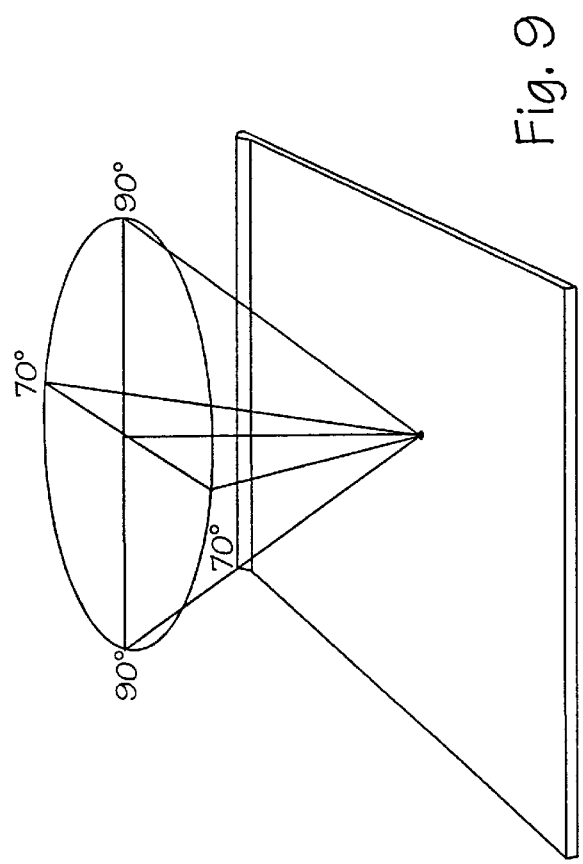
Fig. 9

CATADIOPTRIC LENS SYSTEM FOR COLLECTING AND DIRECTING LIGHT FROM LARGE APERTURE LUMINESCENT LIGHT ILLUMINATING FIXTURES

RELATED APPLICATIONS

This application is a continuation of Provisional Application No. 60/055,882 filed Aug. 15, 1997 and is co-pending with application Ser. No. 08/675,945 filed Jul. 5, 1996 in the United States of America by applicant, Eric Nieuwklerk entitled: HIGH FREQUENCY DRIVER AND DIMMING CONTROL CIRCUIT FOR GAS DISCHARGE LAMPS assigned to Videssence, Inc., the assignee of this application.

BACKGROUND OF THE INVENTION

1. Field of the Invention

The invention relates to luminescent illumination systems for television, video and film sets and studios.

2. Description of the Prior Art

In U.S. Pat. Nos. 5,012,396 and 5,235,497 the Applicant, Paul D. Costa describes luminescent lighting fixtures and illumination systems providing omni-directional sustained luminescent (florescent and phosphorescent) light emission of desired color/chromaticity from phosphors in an emulsion coating the interiors of luminescent light tubes for television and film studios.

It is important to understand that there are both prompt or fluorescent and delayed or phosphorescent luminescent light emissions excited from the phosphors lining the light tubes. The prompt or fluorescent light emission begins within 10 nsec ($10^{-9}$ sec.) of the exciting stimulus and ceases within 10 nsec after excitation stops. The delayed or phosphorescent light emissions can begin after 10 nsec of the exciting stimulus but persists beyond 10 nsec once excitation stops [See Van Nostrand's Scientific Encyclopedia$6^{Th}$. Ed. 1983 pp. 1237, 1788 & 2204.] The bandwidths of prompt or fluorescent light emissions in many instances are different than the bandwidths of the delayed or phosphorescent light emissions. Also, the phosphor compounds which fluoresce may be different from those that phosphoresce.

As noted in U.S. Pat. No. 5,235,497, luminescent lighting fixtures have relatively large light apertures that generally frustrate efforts to direct and shape the emitted light. Even with the geometry for shaping the light from sustained luminescent lighting fixtures as disclosed in U.S. Pat. No. 5,235,497, the apertures can be unacceptably large, particularly when appropriate variations of shadows, and areas of differing luminosity, brightness, shade, tint and hue are required for providing a believable perception of dimensional depth to a two dimensional (flat) video or film image.

Color television cameras, video cameras, color photography films, digital electron scanning cameras and the human eye each sense or perceive discrete bandwidths of light which are then recombined, integrated and interpreted in a nonlinear fashion as a particular color. In contrast to incandescent lighting fixtures that are characterized with reference to Stefan-Boltzman "blackbody emission temperatures" or 'color temperatures', luminescence light consists of relatively narrow bandwidths of light emissions which do not follow blackbody laws. (A laser is a common example of a luminescent light source producing a coherent amplified light emission in very narrow bandwidths.)

Spectral output of luminescent light sources are better characterized in terms of an index which provides a comparison of colors illuminated (by the luminescent light) to those same colors illuminated, for example, by direct 'white' noon sunlight. (Direct 'white' sunlight typically between noon and 2:00 P.M. is the practical standard for determining color for human vision.) Manufacturers of luminescent light tubes try to blend phosphors to produce different bandwidth distributions of radiant energy usually identified with a proprietary trademark, e.g., LUMILUX®. Descriptive terms such as cool white, warm white, daylight are also frequently relied upon. However, most luminescent light tube manufacturers ultimately resort to characterizing the distribution of different bandwidths of light emitted by their blends of phosphors as producing an effect of illumination equivalent to that produced by incandescent Tungsten filaments at particular temperatures expressed in degrees Kelvin (°K), in tacit recognition of the predominance of Stefan-Boltzman blackbody emission standards.

A better index for characterizing the light output of luminescent light tubes having a selected blend of phosphors emitting a distribution of different narrow spectral bandwidths of light would be the SRGB® standard developed by the Applicant which characterizes the relative radiance of respective red, blue and green primary color bandwidths of sustained luminescent light emanated by a blend of phosphors reflecting from known sets of standard gray scale charts and color band charts.

In particular, the color of a surface is the bandwidths of light reflected from that surface. Such reflected light can be captured, digitally imaged and then sampled using conventional eye dropper tools associated with most computer graphics, design, and image processing software programs. The software eye dropper tools measure and/or characterize such parameters as brilliance, saturation, hue, tint, shade or whatever, in terms of the various color-model systems used by the particular program for specifying color. In a sense, the optical capture system, and associated computer and software tools function as a reflection meter. Diffusely reflected light from a standard chart can be sampled to provide a quantitative color evaluation of its spectral in terms of color(s) reproduced and observed by a human being directing the optical capture system and controlling the computer system.

For example, in the RGB additive model, typical CRT television or computer monitor screens reproduce the color yellow, not spectrally present, by combining various brightness values of red, green, and blue light. James Clerk Maxwell initially demonstrated this effect to the Royal Institute in London in 1861. The L*a*b* (Lab) model developed by CIE[1] mathematically specifies a luminance or lightness (L) value and two chromatic components values (a) specifying a range from green to magenta, and (b) specifying a range from blue to yellow in a way that is supposed to be device independent. The CMY and CMYK color-model system for photography and printing are subtractive/multplicative models that specify values for cyan (C), magenta (M), yellow (Y) filters and ink which absorb light. Values for black (K) inks are specified in printing because available C, M & Y inks combine to reflect a muddy brown. [See Van Nostrand's Scientific Encyclopedia 7th Edition, Vol. 1, pp. 36 & 701, Vol. 2 pp. 2203, 2714] In HSB and HLS color models, an achromatic 'gray scale' value termed 'brilliance' (B) or 'lightness' (L) is specified along with two chromatic values specifying 'hue' (H) and 'saturation' (S). Saturation is a parameter relating to purity of the color, gray being zero. In the HSB model, colors having a more pronounced hue are more chromatic, i.e., differ more from a gray of the same 'brilliance' or 'lightness' 'Brilliance' and 'hue' can in turn be related by using such terms as 'tints' and 'shades.' A chromatic color having little 'hue' but high 'brilliance' is termed a 'tint', e.g., pink, whereas color of low 'hue' and low 'brilliance' is termed a 'shade', e.g. brown.

[1] Centre Internationale d'Eclairage, an international organization which began establishing specifications for color in 1931. CIE has developed a number of comparable standards including CIE XYZ, CIE xyY, CIE L*u*v* and CIE L*a*b*. The television broadcast industry in fact specifies desired chromaticities in picture tube output which then relate to gamma corrected voltages corresponding to red green and blue signals. See 47 CFR § 73.682(20) (iv).

Modern personal computers and associated graphics, design and imaging software programs and tools provide RGB image displays which allow users to manipulate and evaluate color by varying values in one or more of the common and proprietary color modeling schemes using side-by-side color comparison boxes. Such computers and software tools thus, in a very real sense, allow the bandwidth sensitivity of human perception to be integrated into the evolution of illumination standards for producing images of studio subjects and talent.

Titanium dioxide also in the emulsion coatings of luminescent light tubes scatters and mixes the light emissions from the different phosphor compounds in the coating. Ad Lagendijk of the University of Amsterdam and the FOM-Institute for Atomic and Molecular Physics in the Netherlands at the American Physical Society Meeting in March 1991 held in Cincinnati, Ohio, reported a discovery that the velocity of light propagating through a highly disordered scattering medium such as a dispersion of titanium dioxide, appears to be one tenth of that previously assumed. [See *Science News* Mar. 23, 1991, Vol. 139, No. 12, p. 182.] Nabil M. Lawandry of Brown University reported in the March 1994 issue of *Nature*, reported that he and his co-workers discovered that certain dyes when dissolved in a liquid containing tiny particles of titanium dioxide when stimulated by an external energy source, amplify the (luminescent) light emitted by the excited dye (phosphor) molecules. In their experiment, Lawandry et al used a green laser to excite photoluminescent molecules of rhodamine dissolved in menthol. Adding titanium dioxide particles greatly amplified the emitted light. The surprising result was that a medium containing particles that reflect light in all directions can amplify emitted radiation. [See also *Science News* Apr. 9, 1994, Vol. 145, No. 15, pp. 228–229.]

The stability of light emission from luminescent light tubes and capability of blending phosphors to produce distributions of different spectral bandwidths of luminescent light emission permits tailoring to achieve a proper balance of sustained red blue and green bandwidth light emissions optimized for electron scanning/television/video cameras, color films and even two human eyes. However, electronic scanning cameras, including charge-coupled devices (CCDs) which record television and video color images do not mimic human eyes, but rather generate signals representative of spectral energy in separate red, blue and green light bandwidths reflecting off an object. This is accomplished by separating red, green and blue images of the object from the incoming light using, for example, a spilt-cube separation optical system that has appropriate Diachronic coatings which allow transmission of one bandwidth along the principal optical axis while reflecting the other two bandwidths into two adjacent channels typically located on opposite sides of the principal optical axis. The three separate color images are directed onto and converted into electrical image signals by three separate photosensitive or CCD surfaces. Single tube systems use a subtractive color process interposing an array of crossing filters strips to selectively pass representative bandwidths of light. In either case, the resultant electrical signal is then processed to produce signals representative of the respective red, blue and green light bandwidths reflected from the object. [See *Television and Audio Handbook* (1990) K. Blair Benson & Jerry C. Whittaker pp. 6.6, 6.7; and *Television Engineering Handbook* (1986) K. Blair Benson Chap. 4, pp. 4.56–4.76, & Chaps. 11.

The electrical images signals obtained by such electron scanning cameras can then be manipulated to provide color corrected or false color images when reproduced at a television/video monitor screen. It is even possible with present day CHROMAKEY videos systems to electronically subtract the image signal in one or more channels and substitute an image signal from a completely different source to produce a composite image at the monitor screen. The electronic systems driving the monitor screens or displays utilize the electrical images signals generated by the cameras for driving an additive color process for reproducing hues of the object imaged. [See *Television Engineering Handbook* (1986) K. Blair Benson Chap 12]

In contrast to electronic imaging, in film, color images are reproduced principally by a subtractive color process using colorant filters for controlling the amounts of reflected red blue and green light from an object to create a positive or negative image of the object in a light sensitive chemical emulsion. [See *Van Nostrand's Scientific Encyclopedia 7th Edition*, Vol. 2 pp. 2203, 2714]

Finally, the UV radiation flashes driving luminescent light emissions from phosphors impart cyclic variation to the stimulated light. If the cyclic variation is slow as when using a 60 Hertz ballast (producing 120 flashes per second), rapidly moving objects illuminated produce "blurred ghost like" images referred to as a stroboscopic effect. The illumination industry characterizes cyclic variation in luminescent light emissions as flicker specifying a Flicker Index which is a relative measure of the cyclic variation in output of various sources at a given power frequency.

Catadioptric lenses use both reflection and refraction to redirect or bend light and can be utilized disperse, collect, collimate and gather or concentrate light in a manner similar to Fresnel lenses. [See U.S. Pat. No. 4,755,921, Nelson, & U.S. Pat. No. 4,791,540. Dreyer et al.] However, as explained in U.S. Pat. No. 5,568,324, Nelson et al, because the index of refraction is frequency/wavelength dependant in optically transmissive materials, catadioptric lens systems like other refractive optical components, exhibit chromatic aberration, i.e., optical materials refract different wavelengths of light dispersively. In U.S. Pat. No. 5,568,324, Nelson et al presents a solution a problem of chromatic aberration in an over head projection (OHP) system using a light source located below and to one side of a planer face of a divergent catadioptric lens by utilizing a doublet condensing lens system where the divergent catadioptric lens has a planer face and a structured face of prismatic ridges in combination with a convergent catadioptric lens also having a planer face and a structured face of prismatic ridges where the respective structured faces of the respective catadioptric lenses are located in an aligned facing relationship.

SUMMARY OF THE INVENTION

A projection illumination fixture includes luminescent light tubes lined with an emulsion coating including titanium dioxide and phosphors for producing an appropriate mixture of highly scattered red, blue and green wavelengths of sustained luminescent light emission, a reflector housing for reflecting scattered rays of emitted luminescent light toward an aperture, a catadioptric lens for collecting and redirecting luminescent light rays reaching the aperture into and through a light snoot or barrel and a large area projection (magnifying Fresnel) lens at the end of the light snoot or barrel for projecting and spreading the emitted light to fill an illumination field or volume.

A particular aspect of the invented projection fixture relates to positioning a 'gobo" or aperture of a particular shape adjacent the catadioptric collector lens for shaping or tailoring cross section the light beam output subsequently projected and spread by the projection lens in the illumination field.

A primary advantage of the invented projection illumination fixture relates to the fact that the titanium dioxide emulsion coating lining the luminescent light tubes produce, in essence, an infinite array of distributed omni-directional light sources each radiating a sustained formula of selected wavelengths of light, which when collected and redirected by the catadioptric lens, do not exhibit color fringes or moirés. In particular, because the particular wavelengths of rays of luminescent light emissions are uniformly distributed, i.e., spread over an area, unlike a point or concentrated Stefan-Boltzman continuous spectrum or "blackbody" radiating (hot) filament, there is no chromatic aberration in the light collected and redirected by the catadioptric lens.

Another primary advantaged afforded by the invented luminescent projection illumination fixture is that by appropriately configuring the catadioptric collection lens, the effective light emitting aperture large luminescent light tube arrays can be effectively reduced to allow for both: (i) magnification (projection) by appropriately located, inexpensive large area Fresnel lenses; and (ii) light tailoring via 'gobos' and the like.

Still another aspect of the invented luminescent projection illumination fixture relates to its directional light output enabling lighting directors to cast directional arrays of shadows for providing believable depth to video and film images recorded in two dimensions.

DESCRIPTION OF DRAWINGS

FIGS. 7, 8 and 9 are diagrams illustrating transmission light through a catadioptric lens.

DESCRIPTION OF PREFERRED AND EXEMPLARY EMBODIMENTS

Figure 1:
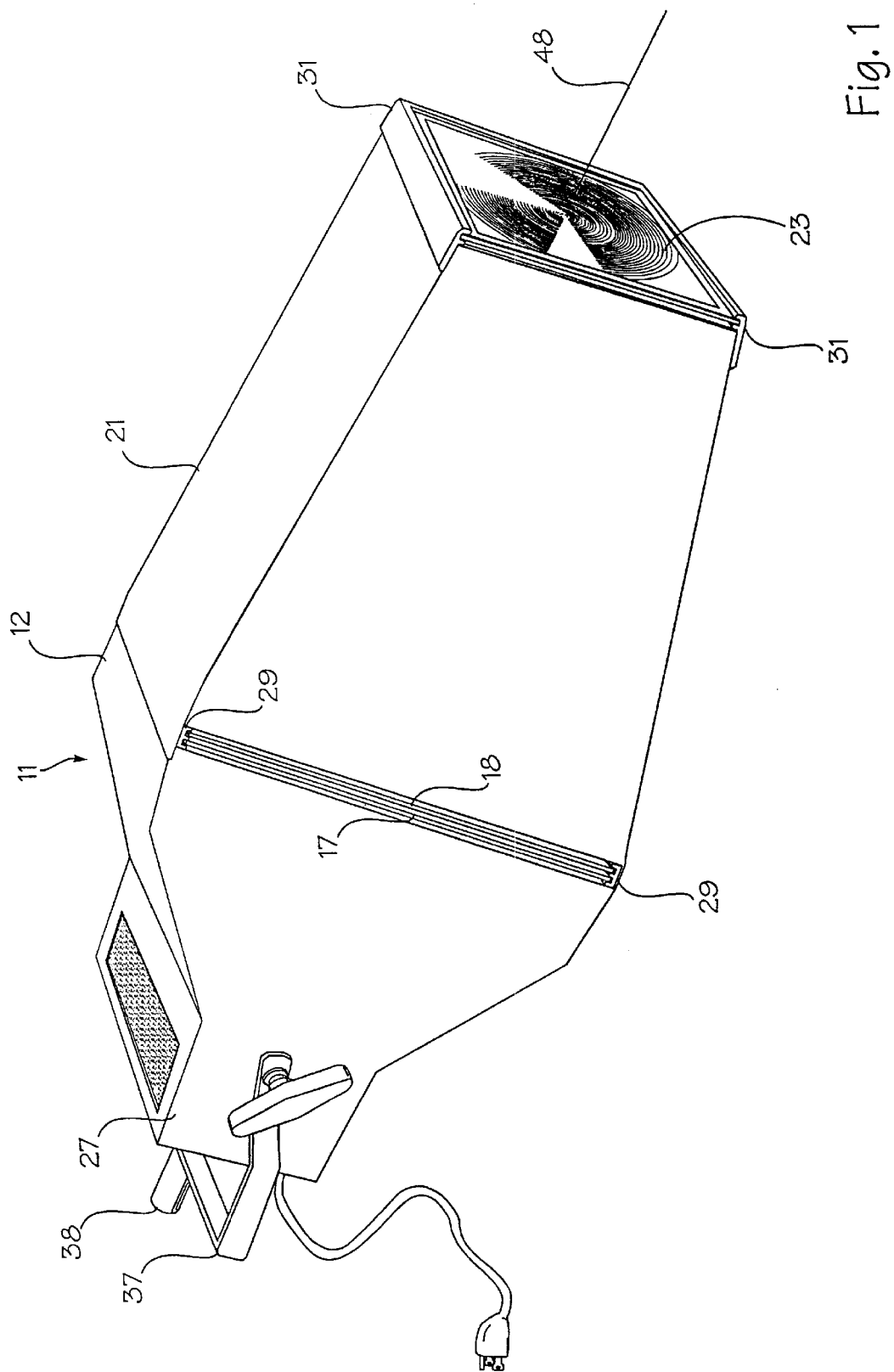
FIG. 1 is a perspective view of the invented projection illumination fixture showing its exterior elements.
Figure 2:
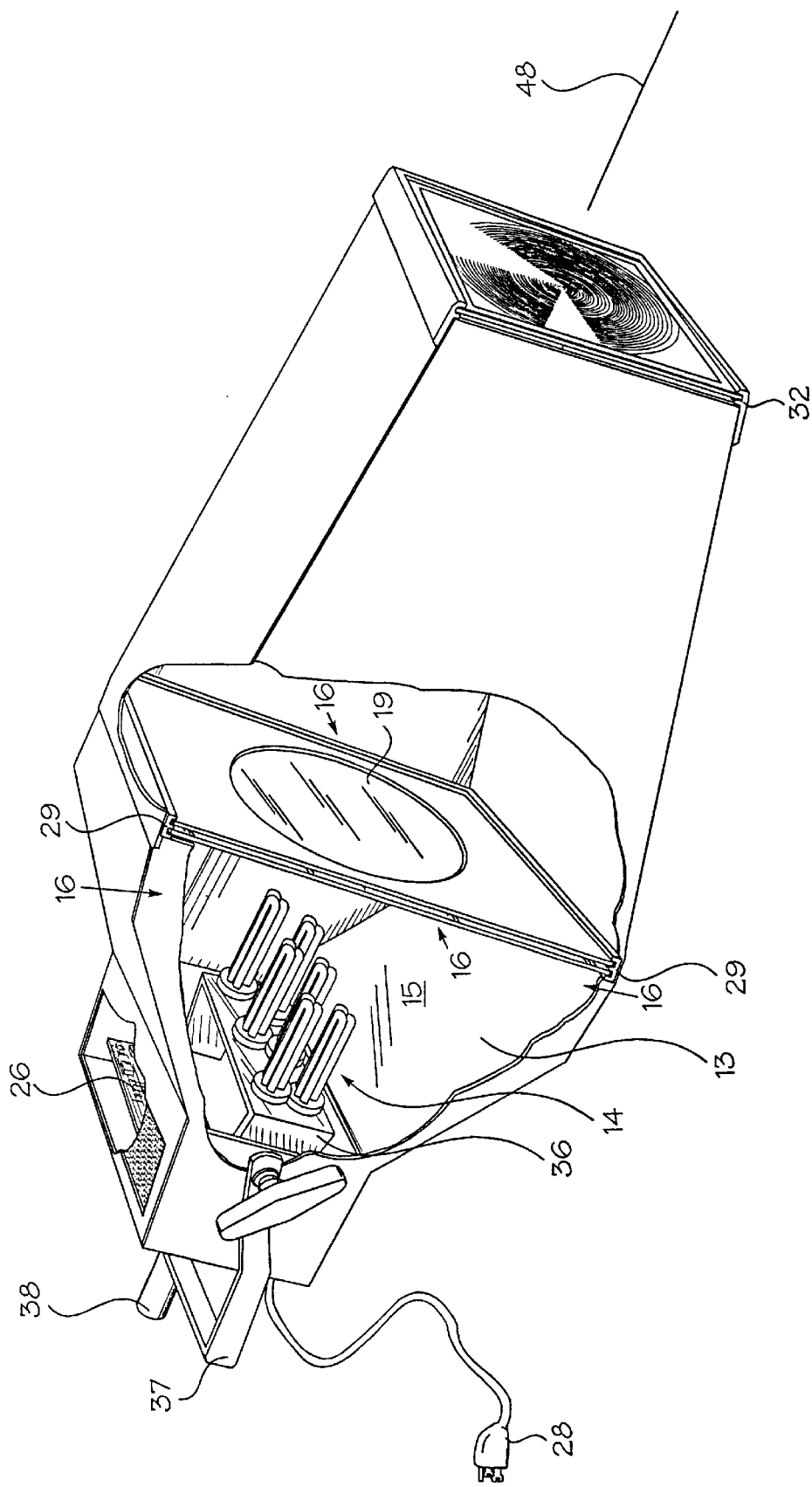
FIG. 2 is cut away perspective of the invented projection illumination fixture illustrating its interior optical components.
Figure 3:
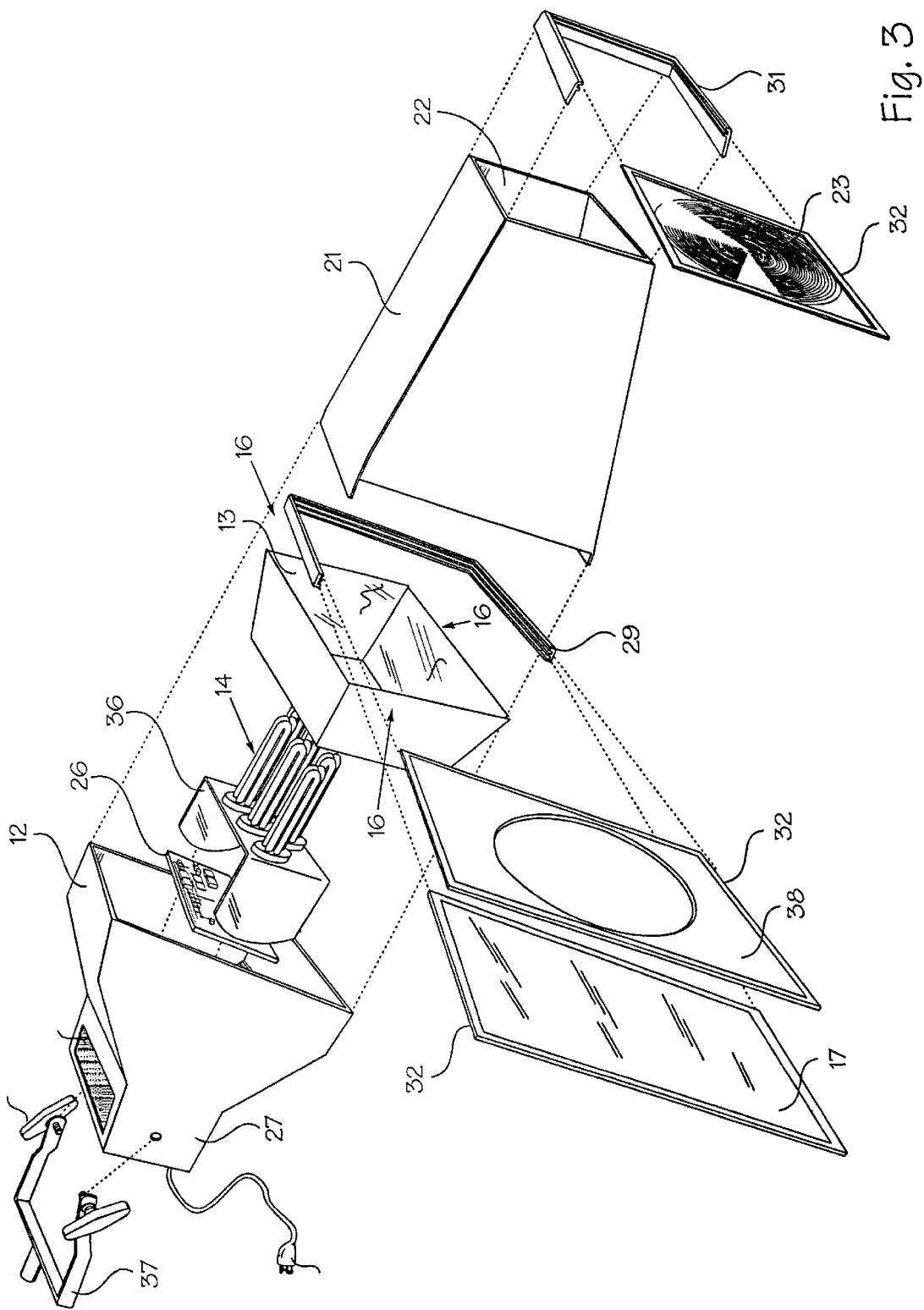
FIG. 3 is an exploded perspective showing the components of the invented projection illumination fixture.

Looking at FIGS. 1 through 4, the invented projection illumination fixture 11 includes a reflector housing 12 with internally supported reflecting surfaces 13 defining a trapezoidal hexahedron light cavity volume 15 directing light emitted by a plurality of trichromatic luminescent light tubes 14 toward a reflector cavity aperture 16 at its base. A transmissive catadioptric lens 17 is disposed across the reflector cavity aperture 16 for optically collecting the light dispersively radiating toward the cavity aperture and converting it into a more-or-less or directed "divergent" light beam. A gobo 18 with a pre-selected shaped aperture 19 is located immediately outward from the catadioptric lens 17 for shaping the cross section configuration of the directed light beam from the catadioptric lens 17. A light snoot or barrel 21 secured to the reflector housing 12 tapers to a second rectangular snoot aperture 22 slightly smaller than the reflector cavity aperture 16. A projection lens 23, preferably a Fresnel type, is disposed across the snoot aperture 21 and projects and focuses the shaped beam of light to fill an illumination field or volume 24 a known distance from the fixture 12. The side walls of the light snoot 21 are preferably non-reflective such that escaping light directed by the catadioptric lens striking the snoot walls is not reflected into the Fresnel type projection lens 23 and projected off its principal optical axis 48 (See FIG. 5).

The invented projection fixture 11 includes U-shaped rectangular slide-mounting frames 29 and 31 at the reflector housing aperture 16 and snoot aperture 22 respectively for mounting and positioning the catadioptric lens 17 and gobo 18 across aperture 16 and the projection lens 23 across the snoot aperture 22. The gobo 18 and catadioptric and projection lenses 17 & 23 are each mounted in rigid rectangular frames 32 sized to be received and slide into the particular U-shaped slide-mounting frame 29 or 31. Conventional latches (not shown) secure the framed catadioptric lens 17, gobo 18 and projection lens 23 in the respective U-shaped slide mounting frames 29 and 31 to prevent them from sliding out of the fixture when it is moved.

The U-shaped slide mounting frames 29 & 31 facilitate switching of the gobo 18, the catadioptric lens 17 and the projection lens 23 in the invented fixture to meet different lighting objectives. The ease of removing and replacing the framed gobo 18 also allows for easy adjustment of the beam cross section by altering the gobo aperture 19. A skilled lighting director can even modify (enlarge) an existing gobo aperture 19 by simply cutting it to a desired shape with scissors.

The invented projection Illumination fixture 11 also includes a typical pivoting bracket 37 connected to reflector housing 12 with a central clamp post 38 ideally extending coaxially with the principal axis 48 of the fixture to allow the fixture to be securely positioned on lighting rails and aimed in a conventional manner.

Appropriate electronic driver circuits 26 are located in an integral bay 27 of the r reflector housing 12 and are conventionally powered electrically, for example, via a conventional electrical power cord 28. The electronic driver circuits 27 provide high frequency current (electron) pulses from 25 to 100 kHz for exciting UV flashes within the light tubes 14. The UV flashes in turn stimulate the phosphors in the emulsions lining the interior of the light tubes to emit sustained luminescent light having an appropriate (red, blue and green) wavelength distribution for correctly reproducing colors when reflected from surfaces and reproduced in films or via video signals. The light tubes 14 in turn secured to a bracket 36 straddling the driver circuits 26 extend at the apex into the trapezoidal hexahedron light cavity volume defined by the reflector surfaces 13.

Suitable collecting transmissive catadioptric lens 17 for the invented fixture 11 may be formed, shaped or molded from any transparent homogeneous material nominally having a uniform index of refraction ranging up from 1.3. The refracting and reflecting surfaces of such lens 17 need not be highly precise optically, as a sharply focused light in the illumination field 24 is not desirable. The frames 32 need only provide sufficient rigidity to the lens 17 for holding it essentially in a plane across the reflector-housing aperture 16. Ripples or non-planar deformation the lens 17 should be minimized. However small deformations can usually be tolorated if light flux directed non-symmetrically off axis is not significant relative to the desired directed light flux output of the fixture. Such ripples and deformations essentially re-direct light illuminating undesired areas outside the illumination region 24.

In addition to directing light from the cavity housing 12, the catadioptric lens 17 also serves to diffuse the directed light such that light intensity or light flux within the shaped portion beam determined by the gobo aperture 19 is relatively uniform without 'hot spots'. Suitable materials for such catadioptric lens include glass and transparent polymeric materials such as acrylic, polycarbonate, polypropylene, polyurethane, polystyrenes, and polyvinyl chloride.

A catadioptric lens 17 composed of polycarbonate having a smooth surface facing inward toward the light tubes 14, consisting of a linear array of identical regular two (2) faceted triangular prismatic ridges angled at 70° available from 3M® was found by the Applicant to be suitable in prototypes of his invented fixture. The particular catadioptric lens effect provided by such 70° polycarbonate film is refraction and reflection of light through the structured surface that for the most part emerges within an ellipsoidal envelope angle of 70° in a plane perpendicular to the surface oriented perpendicular to the prismatic ridges and to essentially 90° or so in the orthogonal plane parallel the prismatic ridges. [See U.S. Pat. No. 4,791,540. Dreyer et al. Col. 4, line 53 through Col. 5, line 17 & U.S. Pat. No. 3,712,713 Appledorn, Col. 4, lines 10–56.]]

The applicant observes, considering of the teachings of U.S. Pat. No. 4,755,921 John C. Nelson, for efficiently collecting and appropriately redirecting light radiating into and through the aperture 16, that suitable designs for catadioptric lens composed of light transmissive materials include at least one structured surface of prismatic ridges with three or more faceted surfaces oriented in linear, rectilinear rectangular or smoothly curved parallel and concentric arrays. However, both surfaces of the lens may be structured. [See U.S. Pat. No. 4,900,129 D. F. Vanderwerf] Depending on the optical result desired, e.g., maximized projected light intensity/flux, the structured surface can face outward toward the snoot aperture 22 or inward toward the reflectors 13 and light tubes 14 in the reflector housing 12.

The Applicant discovered that the light from the array of luminescent tubes 14 radiating through the rectangular aperture 16 collected and redirected by catadioptric lenses 17 does not exhibit significant chromatic aberration or Moiré patterns. This is because light emissions from the different luminescing phosphor compounds in the emulsions coating lining interior surfaces of the light tubes 14 are omnidirectional, as well as being scattered by the titanium dioxide in the emulsion coating. In essence, every theoretical point in the radiating emulsion coating the inside of luminescent tubes 14 can be assumed to be uniformly radiating in every direction at each of the respective frequency bandwidths of the particular chosen luminescing phosphors. While chromatic aberration or scattering of each theoretical point source light emission would and does occur, because luminescent light emission is distributed over a large area (relatively) and radiates into each theoretical point on the input surface of the catadioptric lens more or less uniformly through a theoretical hemisphere centered on each such point, the chromatic aberration/scattering of the transmitted light averages. This means that the chromatic content of the light emerging from each theoretical point on the output lens surface is uniformly mixed. [See U.S. Pat. No. 2,050,429, W. A. Dorey et al.]

Using the same analogy, each theoretical point on the reflecting surfaces 13 within the housing 12 directing emitted light toward the cavity aperture 16 light can be also assumed to be radiating omni-directionally through such theoretical hemisphere centered above such point. And, as appreciated by Dreyer et al in U.S. Pat. No. 4,791,540 the catadioptric lens 17 itself reflects light back into the reflector housing 12.

Because the light from the luminescent tubes 14 and reflectors 13 radiating into the catadioptric lens 17 is distributed, not concentrated or localized, it is not necessary for its prismatic ridges or faceted surfaces of the lens to be graduated relative to an emission point as with blackbody (hot) radiating filaments to achieve a uniform distribution of the transmitted light flux in the illumination field 24. [See generally U.S. Pat. No. 4,741,613, D. F. Vanderwerf and U.S. Pat. No. 4,859,043, P. Carel et al, Col. 5, line 59 through Col. 6, line 16 which discuss the necessity for such graduations in the faceted lens surfaces for spreading concentrated light sources]

Similarly, because the purpose of the invented fixture is to provide an area of uniform light intensity at the illumination plane/region 24, precision optics is not necessary for the projection lens 23 disposed across the snoot aperture 21. In fact, "full page" 2× power page magnifying Fresnel sheet lens (approximately 8½"×11") used as a collector disposed across the light snoot aperture 22 14 to 15 inches distant from the gobo 18 was found satisfactory for projecting a shaped beam of light from the gobo aperture 19 to a desired illumination field or a volume ranging from five to fifteen feet distant from the fixture 12. The Applicant found that better projected illuminating light was obtained by locating the plane of the gobo 18 at perpendicular distance from and sheet lens greater than the nominal focal length of the 2× power Fresnel magnifying sheet lens but less than twice such nominal focal length. The objective is looking at FIG. 4, to locate the sheet Fresnel magnifier lens in a plane sufficiently distant from the gobo such that the projected gobo aperture is inverted in the illumination field.

The critical optical parameters of the invented fixture relate to: (i) the nominal focal length $F_L$ of the Fresnel projection lens; (ii) the f-number of the projection lens 23, i.e., the ratio of its focal length to its diameter; (iii) the perpendicular distance, $D_G$ between the plane of the gobo 18 and the plane of the projection lens 23; and (iv) the desired projection distances, $D_P$, to various planes in the illumination field. Classically $D_G$ and $D_P$ are the so called finite conjugates of the Fresnel lens. The focal length, distance to gobo plane and a selected projection distance to any plane in the illumination field perpendicular to the principal optic axis of the projection lens can be related using thin lens assumptions by the relationship[2]:

[2] See Halliday, Resnick, Walker *Fundamentals of Physics* 4th, (1993) Chap. 39, § 11 (pp. 1033–1035).

$$\left[\frac{1}{D_G}\right] + \left[\frac{1}{D_P}\right] = \left[\frac{1}{F_L}\right].$$

By algebraic manipulation this yields the relationship:

$$F_L = \frac{D_G \cdot D_P}{D_G + D_P}.$$

A factor significant in limiting the projection distance is the light intensity desired in the spatial volume to be illuminated (the illumination field). The skilled lighting director or illuminator should bear in mind that the cross section of the projected shaped beam increases with distance from the fixture while intensity decreases. And, from the point of view of the observer (a camera), it is not the intensity of the light in the illuminated spatial volume that is most important, but rather the variations in intensity of light reflecting or scattering from surfaces of objects and/or talent illuminated within that volume. In addition, the skilled optical designer optimizing the invented projection illumination fixture for particular applications need also consider tradeoffs between the desired light intensity in the illumination field and such inter-related factors as (i) the efficiency of the catadioptric lens in redirecting the scattered sustained luminescent light into a desired divergent ellipsoidal cone, (ii) the length of the light snoot,(iii) the f-number of the Fresnel type projection lens, (iv) the number (volume) of luminescent tubes that can be mounted within reflector cavity and (v) reflectivity of the reflectors directing light out the reflector cavity aperture.

In the example given above, using a 2× power page magnifier Fresnel lens as collecting projection lens 23, locating the gobo approximately 14 to 15 inches from the plane of the lens 23 produced acceptable levels of illumination in a volume ranging 5 to 15 feet from the fixture.

Figure 4:
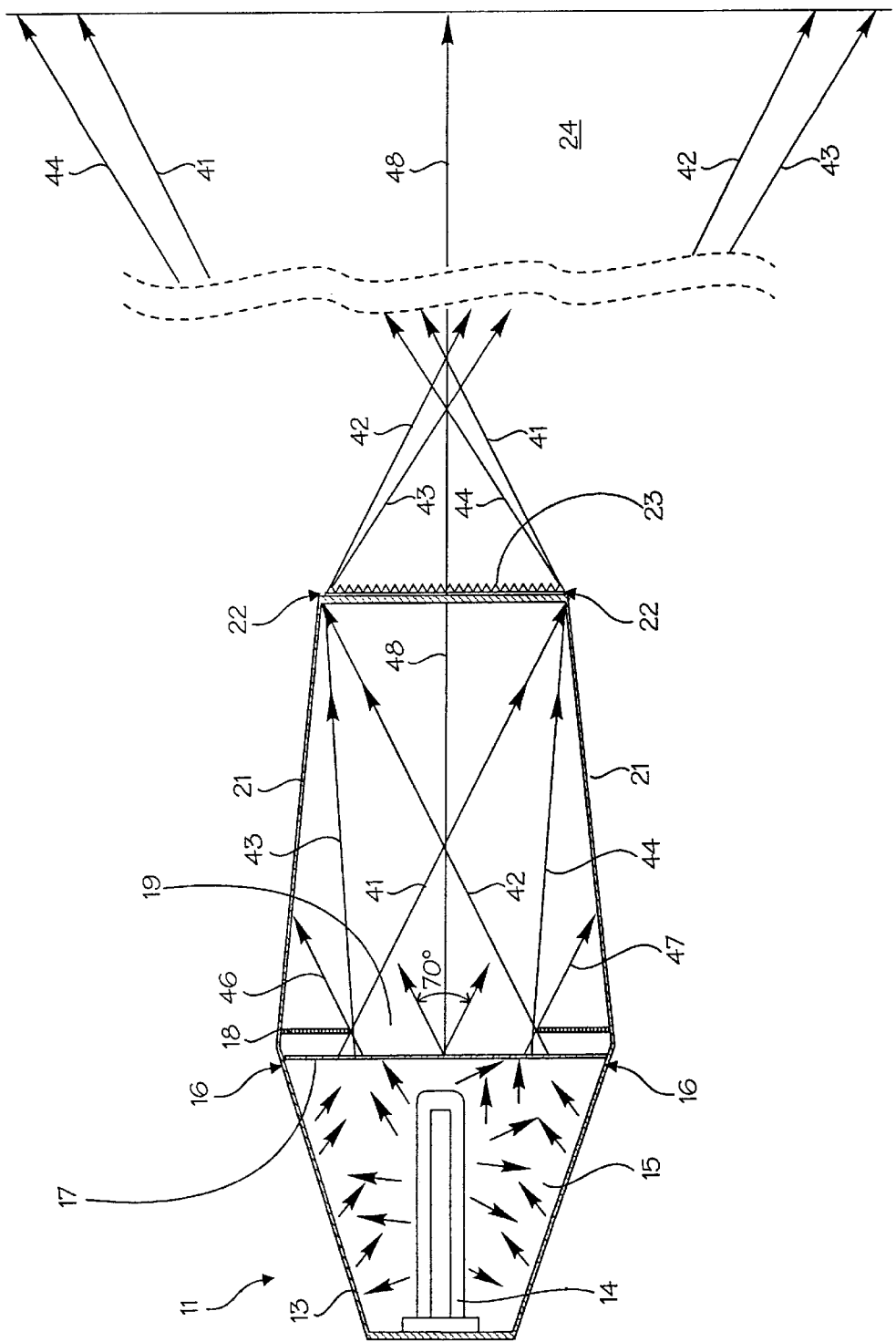
FIG. 4 is a cross section of the invented projection illumination fixture illustrating boundary optical ray traces through the by the optical components of the fixture.

Concentrating now on FIG. 4, the boundary optical paths through the optical components of the invented projection fixture 11 are primarily determined by the catadioptric lens 17 which predominantly confines light emerging from each theoretical point on its structured surface to an elliptical cone ranging from 70° in a plane ⊥ to the prismatic ridges (also angled at 70°) and to approximately 90° in a plane ∥ the prismatic ridges (a function of the relative refractive index parameters establishing total internal reflection of light within the lens). Assuming the cross section of figure is ⊥ to the prismatic ridges, within the gobo aperture 19, boundary rays 41 and 42 radiating at angles of 55° and 125°, respectively, relative to the plane of the lens 17 reach the snoot aperture 22 and are projected by the projection lens 23. Boundary rays 43 and 44 radiating at angles greater than 55° and less than 125° from the surface of the lens 17 will also reach the snoot aperture 22 and be projected by the Fresnel type projection lens 23. Boundary ray 46 and 47 radiating at angles of 125° and 55°, respectively strike the walls of the snoot 21. The portion of the light radiating from the surface of the lens 17 from 55° to approximately 90° between boundary rays 41 & 47 and from approximately 90° to 125° between boundary rays 42 and 46 will strike the walls of the snoot 21. Preferentially, light rays striking the walls of the snoot 21 are redirected or absorbed in a manner to prevent collection and projection off the primary projection axis 48 of the projection lens 23.

The projection lens 23 collects the directed light rays radiating more or less conically from the catadioptric lens 17 out the gobo aperture 19 through the snoot aperture 22 along its principal optical projection axis 48, and directs the collected light rays though a focal region indicated at 51 into the illumination field.24. Because the light directed by the catadioptric lens 17 is diverging within an ellipsoidal cone from 70° to 90°, light within the shaped beam arriving at the illumination region 24 is fuzzy or 'soft'. This means in essence that light rays simultaneously emerging from each theoretical point on the surface of the catadioptric lens collected and projected by the projection lens 23 continue to diverge within that 70° to 90° ellipsoidal cone relative to each other in the illumination region 24. Further, it should be appreciated that a higher intensity or flux light radiates from the fixture before within the volume defined by boundary rays 43 & 44 which after inverting at the focal region of the projection lens spreads or projects over a larger area in the illumination field. The converse is true for light falling within the envelope of boundary rays 41 and 42. Accordingly, the transition from light inside the shaped beam to dark outside the shaped beam in the illumination region 24 is not a sharp transition but more of a gradual transition. The sharpness of the transition between light and dark regions of the shaped projected light beam is also a function of the projection lens focal length $F_L$ and the conjugate distances $D_G$ and $D_P$ from the projection lens to the gobo and the projection plane respectively. Accordingly, a consummate lighting director can manipulate the transition between light and dark regions of the shaped light beam in the illumination field by using projection lenses with different focal lengths and by moving the fixture toward and away a particular reference plane in the illumination field.

The skilled lighting director or illuminator must also remember in using the invented projection illumination fixture that the light sensitivity of the human eye is not straight forward, nor linear. For example, personal computers can reproduce literally millions [$(2^{24})$=16,777,216] of different colors using only mixtures of red blue and green light frequencies each being assigned 8 information bits, tens of thousands of which may be differentiated by the human eye and brain. Further, the human brain interpreting what the eyes senses, responds to variations in intensity, relative brightness and darkness to provide perceptions of depth. Divergence in the illuminating light likewise provides essential data for human depth perception. For example, gradations of hue of a hanging green leaf scattering diverging sunlight allows a human being to determine the orientation of the leaf in space. Similarly, the curvature of smooth surfaces such as automobile fenders is revealed by highlights and gradations in tints and hues perceived in light scattering from such surfaces typically radiating from divergent sources such as sunlight.

The beauty of the catadioptric lens 17 in the invented projection system, looking at FIGS. 7, 8 & 9, is that light 79 enters the lens 17 (via the reflector housing aperture 16) essentially hemispherically divergent at every theoretical point on the entrant surface 78 of the lens 17, but predominantly radiates or exits from the lens from each theoretical point on the exit surface 79 of the lens 17 in a ellipsoidal cone. A small percentage of light also emerges from the exit surface 79 of the lens in regions 84 of the theoretical exit hemisphere (FIG. 8). The angle of the faceted prismatic ridges 81 primarily determines the angle of divergence of the radiating light in a plane 82 oriented perpendicular (⊥) to the ridges 81. The index of refraction of the material composing the lens determines the angle of divergence of the radiating light in a plane 83 parallel to the ridges 81. The chromatic content of such entrant and radiant light (determined by the luminescing phosphors of the light tubes) is a homogeneous mixture of desired ratios of red blue and green light frequencies. The projection Fresnel type lens 23 projects such chromatic diverging light to the illumination field 24 where in essence each theoretical point in plane perpendicular to the principal optical axis of the projection lens likewise is divergent in an ellipsoidal cone (70° to 90°) since the illuminating beam at such plane is essentially an enlarged inverted image of the gobo aperture 19.

Lighting and illumination directors lighting sets and stages can literally 'paint' both talent and surfaces located within the beam cross section of the invented projection fixture with the selected ratios of red blue and green light frequencies such that the surfaces so 'painted' scatter (reflect) it in a manner which creates a distribution of hues, shades tints and brights capable of being recorded by film or by video systems sensitive to those light frequencies. Images reproduced from such recorded films and video signals will present a similar distribution of hues, shades, tints, and brights determined by the limits of the particular recording/sensing mechanism.

Figure 5:
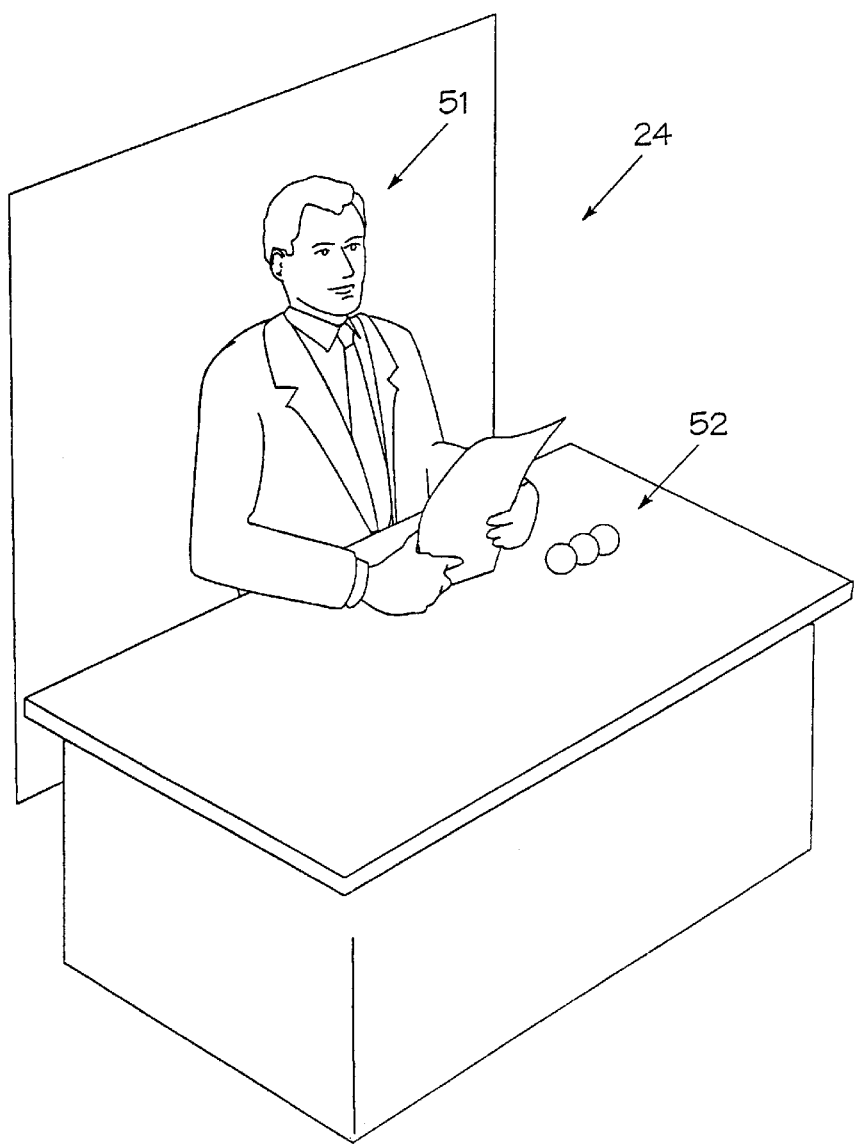
FIG. 5 illustrates an image of talent seated in an illumination field before a camera without directional lighting.
Figure 6:
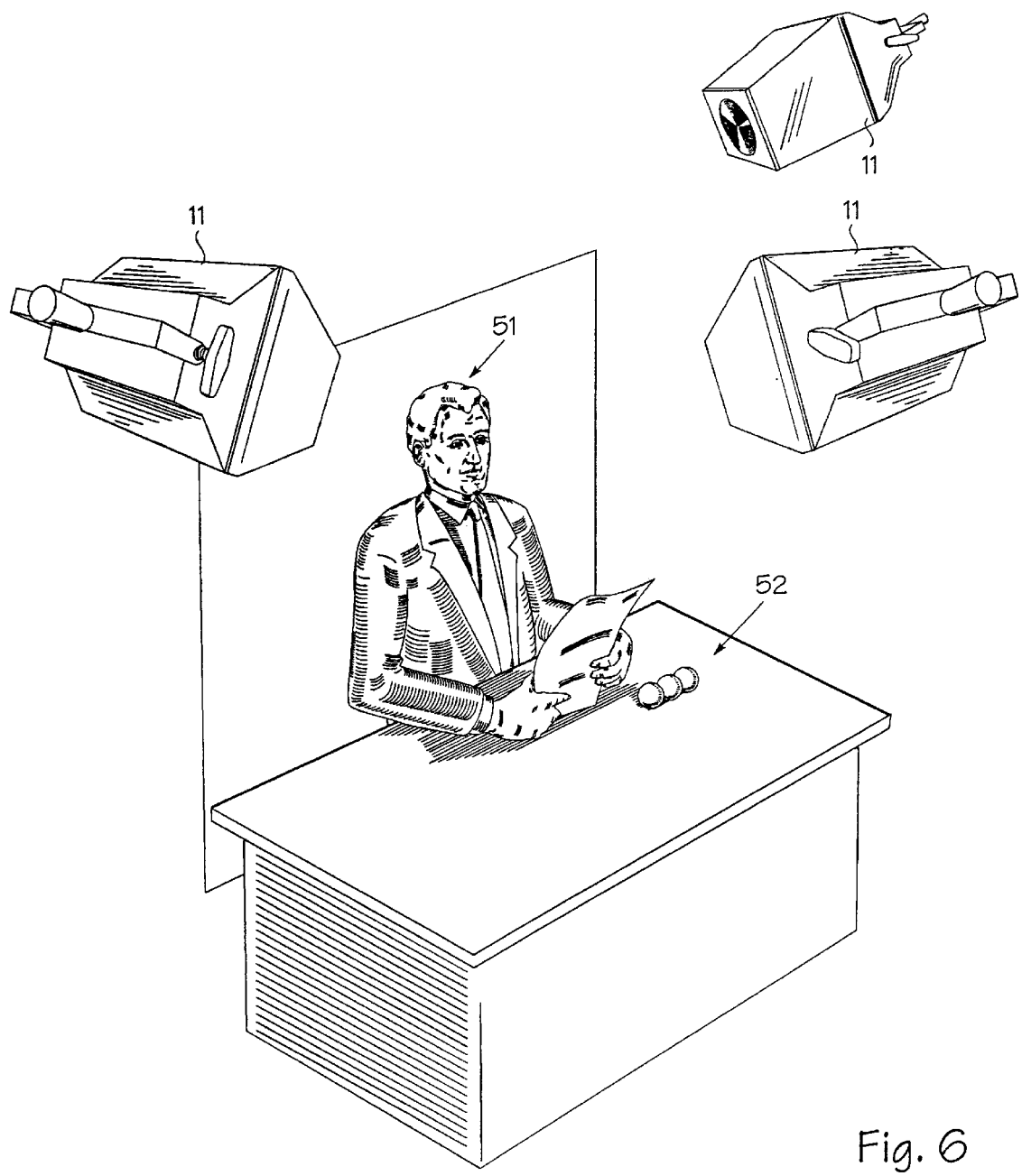
FIG. 6 illustrates an image of talent seated in an illumination field before a camera with directional lighting provided by three of the invented projection illumination fixtures.

For example, looking at FIG. 5, without directional illumination a reproduced image of talent 51 and objects 52 located within an illumination region 24 otherwise adequately lite, will appear flat or 'cartoonish' with planar regions of different colors not having any visually apparent dimensional differentiation. Adding directional divergent light using one or more of the invented projection illumination fixtures (FIG. 6) adds a distribution of hues, shades, tints and brights to the reproduced image which in turn provide visually apparent dimensional differences to the different colored areas composing the image. Skilled lighting directors use such directional divergent light to create highlights (brights & tints) with related shadows (hues and shades) to provide definition. For example, an image of a talent presenting the latest news becomes believable and recognizable because of a highlighted cleft chin above a chin shadow, or a bright forehead shaded by elegantly or not so elegantly coifed hair, or because of a determined nose, or full (sensuous) lips.

An example of the visual impact the above phenomenon on human beings, can be easily appreciated by comparing early 'flat' Graphical User Interface (GUI) Operating System (OS) programs for personal computers with the dimensionally shaded, window frames and icons which typify present day GUI OS programs for those same personal computers. Today graphical computer programs are typically capable of providing dimensionality to computationally created images by locating a divergent radiating light source relative to an image, calculating and then displaying shaded and bright areas of the image as illuminated by the light source. Computer game and simulation programs are even capable, to a degree, of presenting moving computational images with a dynamic play of shadows and brights to enhance the reality of the virtual environment presented visually on a screen to the human being playing the game or experiencing the simulation.

The areas of tints, brights, hues and shades created by directional divergent light also enable artists to touch up their reproduced images. For example, the dimensionality, visually apparent in quality, black and white still images produced by such famed artists as Ansel Adams, is first a function of the skill of the photographer in recognizing recording negative images in light that provides adequate gradations of grays to provide dimensional differentiation between light and dark areas in the (negative) image; and second a function of the artistic skill of the photographer (or developer) in developing prints from such negative images adding and subtracting light (burning and dodging) as necessary in the differentiating gray areas to provide a realistic illusion of dimensional depth to the reproduced (print) image. The shapes and distributions of the different gray areas in the negative, are a function of the shadows cast by divergent directional light illuminating the object or talent, is the information used by the artist in developing the prints.

Today, graphics software programs such as ADOBE® ILLUSTRATOR, ADOBE® PHOTOSHOP® and QUARK EXPRESS® enable the skilled artist even more freedom to idealize (amend) a recorded or digitized (video) still image to emphasis or de-emphasis illusions of dimensionality. Such computational sampling tools as the eyedropper tool for sampling 'color' of an area of a particular tint or hue, the magic wand tool defining areas of a particular color value, the lasso tool and the like are potent tools in the hands of a competent artist who grasps and can render distributions of hues, shades brights, and tints to give an impression or illusion of depth to a planar image. With such software tools areas of a particular hue, shade, tint or bright can be sampled and amended to enhance or mitigate visually apparent dimensionality. The shapes of such particular areas of hue, shade, tint or bright are again determined by the directionality and divergence of the light illuminating the talent or object when the image was originally captured.

Moving images, i.e., successive still images of relatively moving talent and objects, are not as easily manipulated as single still images to provide an illusion of dimensionality because the dynamic distribution or play of shadows (hues and shades) and highlights (tints and brights) on non flat moving surfaces are perceived by the human eye and brain as indicia movement in three dimensional space. Such distributions change with every change in relative position. Accordingly, even with the computational aid of computers systems, it is not usually feasible to routinely retouch a moving sequence of images to provide a believable illusion of depth or dimensionality not present in the light distribution when the images were recorded. This is in contrast, to the film and video entertainment industry where successive images with each with distributions of dimensional hues, shades, tints and brights are routinely, and believably 'morphed' or transformed into other dimensional images. A point of commonality, helping the plausibility of such scenes is a common relative position of a directional divergent light source (virtual or real) creating the dynamic dimensional play of the distributions of hues shades tints and brights in the successive images.

The invented projection fixture enables lighting directors to cast directed shaped beams of divergent light from reference positions into an illumination field or region for the purpose of creating dimensional distributions of highlights (tints & brights) and shadows (hues and shades) to images of talent and objected moving relatively in such space. The ability to manipulate (change) the cross section a directed divergent beam in that illumination field by changing the gobo aperture in the invented projection fixture allows skilled lighting directors to creatively conceal or transform undesired surfaces and areas. For example, in a uniform flat luminescent illumination field without shadows, using a CHROMAKEY video set, a moving 'blue or green' carrier may be effectively transformed, visually, into a magic carpet bearing objects/talent positioned for dimensionality 'painting' in directed divergent luminescent light from one or more of the invented projection fixtures in an illumination field. In such a suggested CHROMAKEY video set, both the primary illumination and dimensionality illumination should be provided by luminescent light tubes with the same formulas or blends of phosphors for producing essentially identical ratios or mix of red, blue and green light frequencies. The ability to tailor the directed divergent beam to avoid dimensionally 'painting' the 'blue or green' carrier, allows for subtraction and substitution of a different image signal for the carrier.

The invented projection fixture for providing directed divergent luminescent light suitable for television, video and film production application has been described in context of representative, exemplary and preferred embodiments. Many modifications and variations can be made to the invented projection illumination fixture, which, while not exactly described or suggested in the foregoing specification, fall within the spirit and the scope of the invention as described and set forth in the appended claims.

I claim:

1. A projection illumination fixture comprising in combination:
   a) at least one luminescent light tube each with an interior tubular surface lined with an emulsion coating including suspended titanium dioxide and phosphors for producing highly scattered sustained luminescent light emission of a desired mixture of red, blue and green light frequencies;
   b) at least one electrical energizing means electrically connected between a source of electrical energy and the luminescent light tube(s) for providing electron current pulses to the luminescent light tube(s) at a rate sufficient to excite/stimulate sustained luminescent light emission from the phosphors in the emulsion coatings;
   c) reflective surfaces positioned relative to the luminescent light tube(s) for reflecting the highly scattered sustained luminescent light emission emitted by the light tube(s) toward a reflector cavity aperture;
   d) a catadioptric lens having at least one structured planar surface for reflecting, refracting and collecting the highly scattered sustained luminescent light emission radiating into the reflector cavity aperture redirecting such light emission to predominantly radiate from each theoretical point on its outward facing planar surface into a light snoot structure toward a snoot aperture in a diverging ellipsoidal cone with an apex angle ranging from 50° to 90°; and
   e) a large area, Fresnel type projection lens having a focal length $F_L$ located across the snoot aperture receiving the redirected sustained luminescent light emission light radiating into the snoot aperture for projecting it to and spreading it in an illumination field.

2. The projection illumination fixture of claim 1 and further including in combination therewith:
   f) a gobo located immediately outward from the catadioptric lens with a pre-selected gobo aperture for shaping a light beam of redirected, sustained luminescent light emission radiating from the catadioptric lens into the light snoot, the projection lens projecting, inverting and spreading the shaped light beam in the illumination field, whereby, regions in the illumination field may be selected for illumination by aiming the shaped light beam of sustained luminescent light emission radiating from the fixture.

3. A projection illumination fixture comprising in combination:
   a) at least one luminescent light tube each with an interior tubular surface lined with an emulsion coating including suspended titanium dioxide and phosphors for producing highly scattered sustained luminescent light emission of a desired mixture of red, blue and green light frequencies;
   b) at least one electrical energizing means electrically connected between a source of electrical energy and the luminescent light tube(s) for providing electron current pulses to the luminescent light tube(s) at a rate sufficient to excite/stimulate sustained luminescent light emission from the phosphors in the emulsion coatings;
   c) reflective surfaces positioned relative to the luminescent light tube(s) for reflecting the highly scattered sustained luminescent light emission emitted by the light tube(s) toward a reflector cavity aperture;
   d) a catadioptric lens for collecting and redirecting the highly scattered sustained luminescent light emission radiating into the reflector cavity aperture into a hollow light snoot structure toward a snoot aperture;
   e) a large area, Fresnel type projection lens having a focal length $F_L$ located across the snoot aperture receiving the redirected sustained luminescent light emission light radiating into the snoot aperture for projecting it to and spreading it in an illumination field;
   f) a gobo located immediately outward from the catadioptric lens with a pre-selected gobo aperture for shaping a light beam of redirected sustained luminescent light emission radiating from the catadioptric lens into the light snoot the projection lens projecting inverting and spreading the shaped light beam in the illumination field whereby, regions in the illumination field may be selected for illumination by aiming the shaped light beam of sustained luminescent light emission radiating from the fixture;

wherein the reflector cavity aperture, gobo aperture and snoot aperture are parallel and aligned along a principal optical axis the gobo aperture being located a distance $D_G$ from the projection lens where $D_G$ is greater than the focal length $F_L$ of the projection lens, and wherein the catadioptric lens is planar having at least one structured planar surface for reflecting and refracting the highly scattered sustained luminescent light emission radiating into the reflector cavity aperture redirecting such light emission to predominantly radiate from each theoretical point on its outward facing planar surface into the light snoot structure toward the snoot aperture in a diverging ellipsoidal cone with an apex angle ranging from 50° to 90°.

4. The projection illumination fixture of claim 3 wherein the reflective surfaces define a reflector cavity having the shape of a trapezoidal hexahedron with inwardly facing, inclined, high reflectivity, sides surfaces diverging from a quadrangular apex to a substantially larger quadrangular base opening defining the reflector cavity aperture, and wherein the luminescent light tube(s) are located and mounted at the apex of the reflector cavity.

5. The projection illumination fixture of claim 4 wherein:
the light snoot structure is a hollow trapezoidal hexahedron having a height defining the distance $D_G$ between the gobo aperture, and wherein
the projection lens and walls defining a quadrangular base opening coinciding with the reflector cavity aperture, taper inwardly toward the principal optical axis to a quadrangular apex opening defining the snoot aperture, the snoot aperture being geometrically similar to and smaller than the reflector cavity aperture.

6. The projection illumination fixture of claim 4 wherein:
the light snoot structure is a hollow trapezoidal hexahedron having a height defining the distance $D_G$ between the gobo aperture, and wherein the projection lens and walls defining a quadrangular apex opening coinciding with the reflector cavity aperture, diverge outwardly away from the principal optical axis to a quadrangular base opening defining the snoot aperture, the snoot aperture being geometrically similar to and larger than the quadrangular reflector cavity aperture.

7. The projection illumination fixture of claim 6 wherein the walls of the light snoot structure diverge outward at angle sufficient to preclude light rays forming the shaped beam of redirected diverging sustained luminescent light radiating through the snoot structure from striking and reflecting from the walls into the projection lens.

8. The projection illumination fixture of claim 6 wherein interior surfaces of the light snoot structure are light absorbing for minimizing reflection of light rays striking the interior surfaces including light rays of the shaped beam of redirected, diverging sustained luminescent light radiating through the gobo aperture.

9. The projection illumination fixture of claim 5 wherein the walls of the light snoot structure taper inwardly at angle for minimizing reflection of entrant light rays striking the walls of the snoot into the projection lens, including entrant light rays of the shaped beam of redirected, diverging sustained luminescent light radiating through the gobo aperture which strike the walls of the snoot.

10. The projection illumination fixture of claim 5 wherein interior surfaces of the light snoot structure are light absorbing for minimizing reflection of light rays striking the interior surfaces including light rays of the shaped beam of redirected, diverging sustained luminescent light radiating through the gobo aperture.

11. The projection illumination fixture of claim 10 and further including in combination therewith:

g) a reflector housing enclosing and mechanically supporting (i) the reflecting surfaces defining the reflector cavity, (ii) the electrical energizing means located behind the apex of the reflector cavity, and (iii) a luminescent light tube mounting bracket for mechanically supporting and electrically coupling removable luminescent light tube(s) to the electrical energizing means.

12. The projection illumination fixture of claim 11 wherein removable luminescent light tubes mechanically secured and electrically coupled to the light tube mounting bracket extend in at least one horizontal plane aligned perpendicular to the reflector cavity aperture, each light tube being symmetrically oriented relative to a longitudinal axis aligned parallel to the reflector cavity aperture.

13. The projection illumination fixture of claim 11 wherein removable luminescent light tubes mechanically secured and electrically coupled to the light tube mounting bracket extend longitudinally into the reflector cavity from the apex of the cavity, each light tube being symmetrically oriented relative to an axis.

14. The projection illumination fixture of claim 11 and further including in combination therewith:

h) a first 'U-shaped' slide-mounting frame secured and located between the hollow light snoot structure and the housing for receiving and positioning at least two flat rigid rectangular structures parallel to the reflector cavity aperture;

i) a second 'U-shaped' slide-mounting frame secured at the quadrangular opening defining the snoot aperture of the hollow light snoot structure for receiving and positioning at least one flat rigid rectangular structures parallel to the snoot aperture; and wherein each catadioptric lens, each gobo and each large area, Fresnel type projection lens are each secured and held, respectively within rigid frame structures, the rigid frame structures securing and holding each catadioptric lens, and each gobo being sized to slide into and be positioned by the first 'U-shaped' slide-mounting frame, the rigid frame structure securing and holding each large area, Fresnel type projection lens being sized to slide into and be positioned by the second 'U-shaped' slide-mounting frame, whereby each projection fixture may have a plurality of catadioptric lenses, a plurality of gobos each with a different aperture, and a plurality of large area, Fresnel type projection lenses enabling a lighting director to mix and match different catadioptric lenses, gobos and Fresnel Type projection lenses to achieve desired illumination objectives.

15. The projection illumination fixture of claim 3 wherein the Fresnel type projection lens has a front stepped, grooved surface planar and a back smooth planar surface, the front stepped groove surface facing out, toward the illumination field located at least a distance $D_P$ from the Fresnel type projection lens.

16. The projection illumination fixture of claim 3 wherein the Fresnel type projection lens has a back stepped grooved planar surface and a front smooth planar surface, the front smooth planar surface facing out toward the illumination field located at least a distance $D_P$ from the Fresnel type projection lens.

17. The projection illumination fixture of claim 11 and further including a mounting bracket for securing the fixture to a stationary structure, the mounting bracket being coupled to the reflector housing by a pivoting mechanical coupling defining a first pivoting axis oriented perpendicular to the principal optical axis of the fixture, whereby the principal optical axis of fixture once mounted, may be rotated (tilted) relative to the first pivoting axis.

18. The projection illumination fixture of claim 17 wherein the mounting bracket for securing the fixture to a stationary structure is a 'U'-shaped structural frame supporting the reflector housing and attached snoot structure between the extending legs, a pair of pivoting mechanical couplings located at the ends the extending legs fastening to opposite sides of the reflector housing.

19. The projection illumination fixture of claim 18 wherein the 'U'-shaped structural frame of the mounting bracket securing the fixture to a stationary structure includes a mounting axle extending centrally from the base of the 'U'-shaped structural frame defining a second pivoting axis orthogonal to the first pivoting axis allowing fixture to be rotated relative to the second pivoting axis whereby, the principal optical axis of the fixture when secured to the stationary structure can be aimed at any point in the illumination field.

* * * * *